(12) United States Patent
Layton et al.

(10) Patent No.: US 11,840,385 B2
(45) Date of Patent: Dec. 12, 2023

(54) COLLAPSIBLE CARGO UTILITY BOX

(71) Applicants: Christine Layton, Riverside, CA (US); Robert Garcia, Riverside, CA (US)

(72) Inventors: Christine Layton, Riverside, CA (US); Robert Garcia, Riverside, CA (US)

(*) Notice: Subject to any disclaimer, the term of this patent is extended or adjusted under 35 U.S.C. 154(b) by 73 days.

(21) Appl. No.: 17/584,620

(22) Filed: Jan. 26, 2022

(65) Prior Publication Data

US 2022/0306337 A1    Sep. 29, 2022

Related U.S. Application Data

(60) Provisional application No. 63/166,988, filed on Mar. 27, 2021.

(51) Int. Cl.
*B65D 6/18* (2006.01)
*B60R 9/06* (2006.01)

(52) U.S. Cl.
CPC .............. *B65D 7/26* (2013.01); *B60R 9/065* (2013.01); *B65D 11/186* (2013.01)

(58) Field of Classification Search
CPC .......... B65D 15/00–24; B65D 9/00–36; B65D 7/00–48; B65D 11/00–28; B60R 9/065
See application file for complete search history.

(56) References Cited

U.S. PATENT DOCUMENTS

| | | | |
|---|---|---|---|
| 1,972,483 A * | 9/1934 | Hartson | B65D 7/26 220/6 |
| 3,527,339 A * | 9/1970 | Cipolla | B65D 7/26 217/14 |
| 3,814,220 A * | 6/1974 | Brody | A45C 7/0036 190/19 |
| 5,299,704 A * | 4/1994 | Thorby | B65D 7/26 224/404 |
| 6,507,701 B2 | 1/2003 | Lake | |
| 6,536,826 B1 | 3/2003 | Reed | |
| 6,543,659 B2 * | 4/2003 | Blair | B60R 9/045 296/100.18 |
| 7,234,618 B2 | 6/2007 | Warganich | |
| D586,123 S | 2/2009 | Lowrey | |

(Continued)

FOREIGN PATENT DOCUMENTS

CA    2505191 A1    10/2005

*Primary Examiner* — Kareen K Thomas
(74) *Attorney, Agent, or Firm* — Argus Intellectual Enterprise; Jordan Sworen; Daniel Enea (57) ABSTRACT

A collapsible cargo utility box for storing items is provided. The utility box comprises a housing having a front wall, a rear wall, and a pair of sidewalls forming an interior volume. An upper wall extends from the rear wall, wherein a lid is pivotally secured to the upper wall. A base forms the bottom section of the housing and is pivotally secured between the front wall and rear wall. The housing is movable between a collapsed configuration and an in-use configuration, wherein the in-use configuration the utility box can transport objects while secured within a bed of a truck and in the collapsed configuration the utility box is easily carried. A pair of cutouts are disposed on opposite sidewalls, wherein the cutouts receive the first or second sidewall in the collapsed configuration. A handle extends from the upper wall to allow for easy transport in the collapsed configuration.

19 Claims, 9 Drawing Sheets

(56) References Cited

U.S. PATENT DOCUMENTS

| | | | |
|---|---|---|---|
| 8,931,670 B2 * | 1/2015 | Fakhari | B60P 3/14 |
| | | | 224/404 |
| 9,132,786 B2 | 9/2015 | Roach et al. | |
| 9,387,812 B2 | 7/2016 | Bexar | |
| D818,420 S | 5/2018 | Roach et al. | |
| 10,743,694 B2 * | 8/2020 | Raphael | A47G 29/141 |
| 10,889,250 B2 * | 1/2021 | Flajnik | B62D 33/0207 |
| 2005/0284906 A1 | 12/2005 | Potts et al. | |
| 2009/0261111 A1 * | 10/2009 | Hsu | B65D 81/3818 |
| | | | 220/666 |
| 2018/0346229 A1 * | 12/2018 | Guerdrum | B65D 21/086 |

* cited by examiner

COLLAPSIBLE CARGO UTILITY BOX

CROSS REFERENCE TO RELATED APPLICATION

This application claims the benefit of U.S. Provisional Application No. 63/166,988 filed on Mar. 27, 2021. The above identified patent applications are herein incorporated by reference in their entirety.

BACKGROUND OF THE INVENTION

The present invention relates to a storage box. The present invention more specifically provides a cargo utility box for storage within a vehicle that is able to be folded and easily transported away from the vehicle when not in use.

Owners of pickup trucks depend on the large storage capabilities that the flatbed compartment provides. Additionally, there is a need for storing smaller items within the main flatbed area to prevent the smaller items from rolling around or getting lost amongst the larger items stored within the flatbed.

There exist some devices that provide for smaller containment storage capable of affixing to a flatbed compartment of pickup trucks. However, these devices fail to provide a versatile device that has the ability to fold down and be easily removed when not in use.

In light of the devices disclosed in the known art, it is submitted that the present invention substantially diverges in design elements and methods from the known art and consequently it is clear that there is a need in the art for an improvement in collapsible cargo utility boxes. In this regard the instant invention substantially fulfills these needs.

SUMMARY OF THE INVENTION

In view of the foregoing disadvantages inherent in the known types of collapsible cargo utility boxes now present in the known art, the present invention provides a new collapsible cargo utility box wherein the same can be utilized for securing to a vehicle and easily collapsing for transport.

It is an objective of the present invention to provide a collapsible cargo utility box comprising a housing having a front wall, a rear wall, and a pair of sidewalls forming an interior volume, wherein an upper wall extends from the rear wall. The upper wall partially covers an upper opening of the housing, wherein a lid is pivotally secured to the upper wall and configured to removably cover the remainder of the opening of the housing.

It is another objective of the present invention to provide a collapsible cargo utility box wherein the housing is movable between a collapsed configuration and an in-use configuration, wherein the in-use configuration the utility box can transport objects while secured within a bed of a truck and in the collapsed configuration the utility box is easily carried.

It is another objective of the present invention to provide a collapsible cargo utility box comprising a base that forms the base of the housing and is pivotally secured between the front wall and rear wall, wherein the base comprises a pair of cutouts disposed on opposite sides thereof and configured to receive the first or second sidewall in the collapsed configuration.

The present invention described herein offers a method of providing a versatile storage containment box for pick-up trucks that has the ability to fold down and/or be easily removed when not in use. The containment box can be made of metal, hard plastic, fiberglass, or any similar material suitable for the purpose. In one possible embodiment, the box is constructed with solid front and rear walls, but with side walls and bottom platform hinged in such a manner as to allow for folding. A hinged upper lid is also provided which can be locked.

In one possible embodiment, the box can also present with an interior removable liner made of nylon, plastic, canvas, or any similar material suitable for the purpose. The liner can be inserted into the box and secured but can also be removed as needed. The liner would mimic the size and shape of the box's interior and present with handles arising from its upper rim to allow easy removal and carrying. This allows for quick and easy transfer of objects to and from the box.

The box can be securely attached to the bed of the pickup by way of adjustable clamps and the like, but is not a permanent attachment. The design allows storage and transportation of personal property in the bed of the pickup. When not in use, the box can be placed in a folded position, freeing up additional space in the bed of the pickup for larger cargo. Unlike other truck boxes, it is lightweight and can also be easily removed and stored inside your home or anywhere else.

It is therefore an object of the present invention to provide a new and improved collapsible cargo utility box that has all of the advantages of the known art and none of the disadvantages.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings.

DETAILED DESCRIPTION OF THE INVENTION

Reference is made herein to the attached drawings. For the purposes of presenting a brief and clear description of the present invention, the preferred embodiment will be discussed as used for storage of items within a truck bed. The figures are intended for representative purposes only and should not be considered to be limiting in any respect.

Reference will now be made in detail to the exemplary embodiment (s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment," "first embodiment", "second embodiment", or "third embodiment" does not necessarily refer to the same embodiment.

Figure 1:
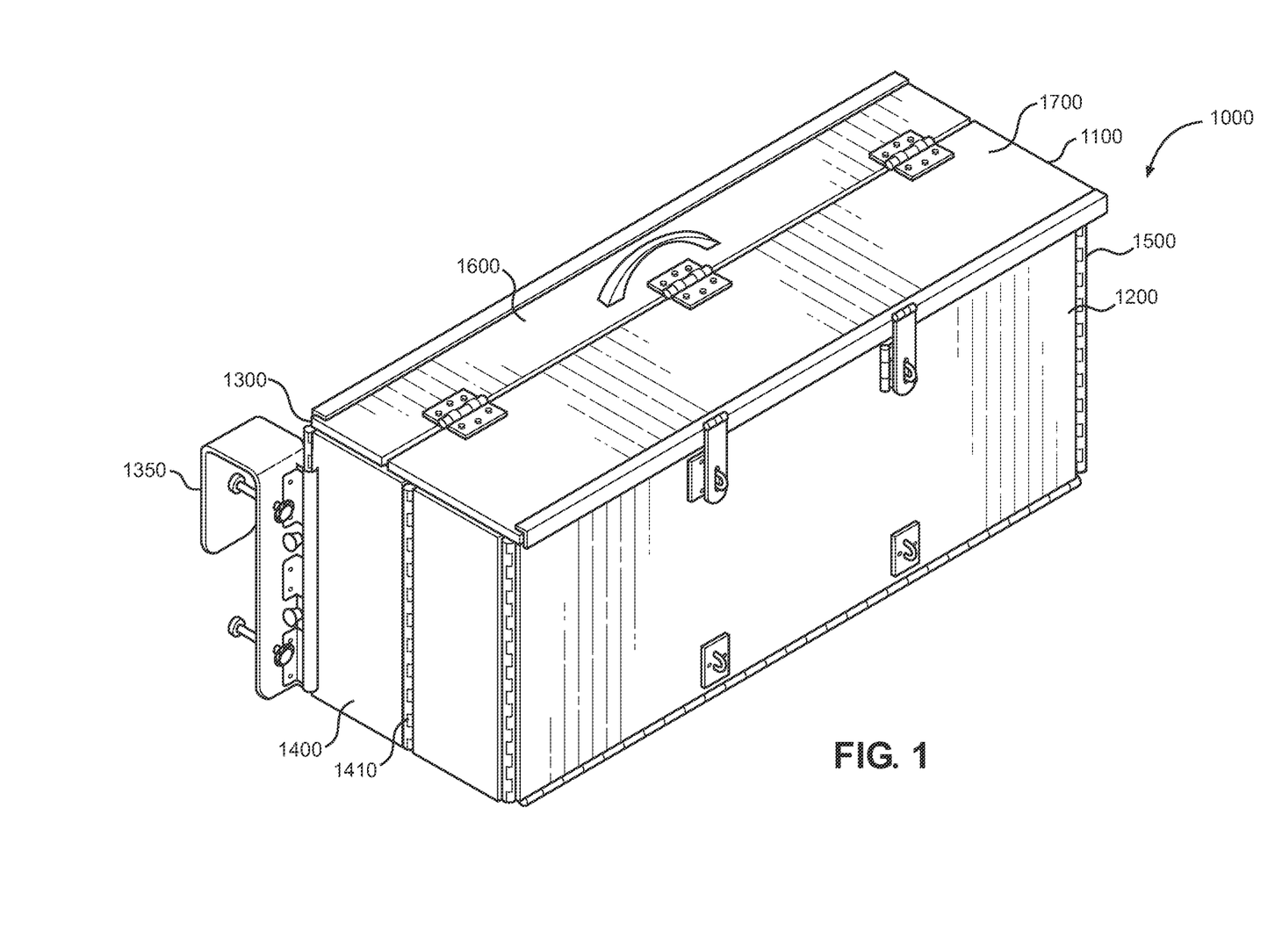
FIG. 1 shows a perspective view of an embodiment of the collapsible cargo utility box.
Figure 2:
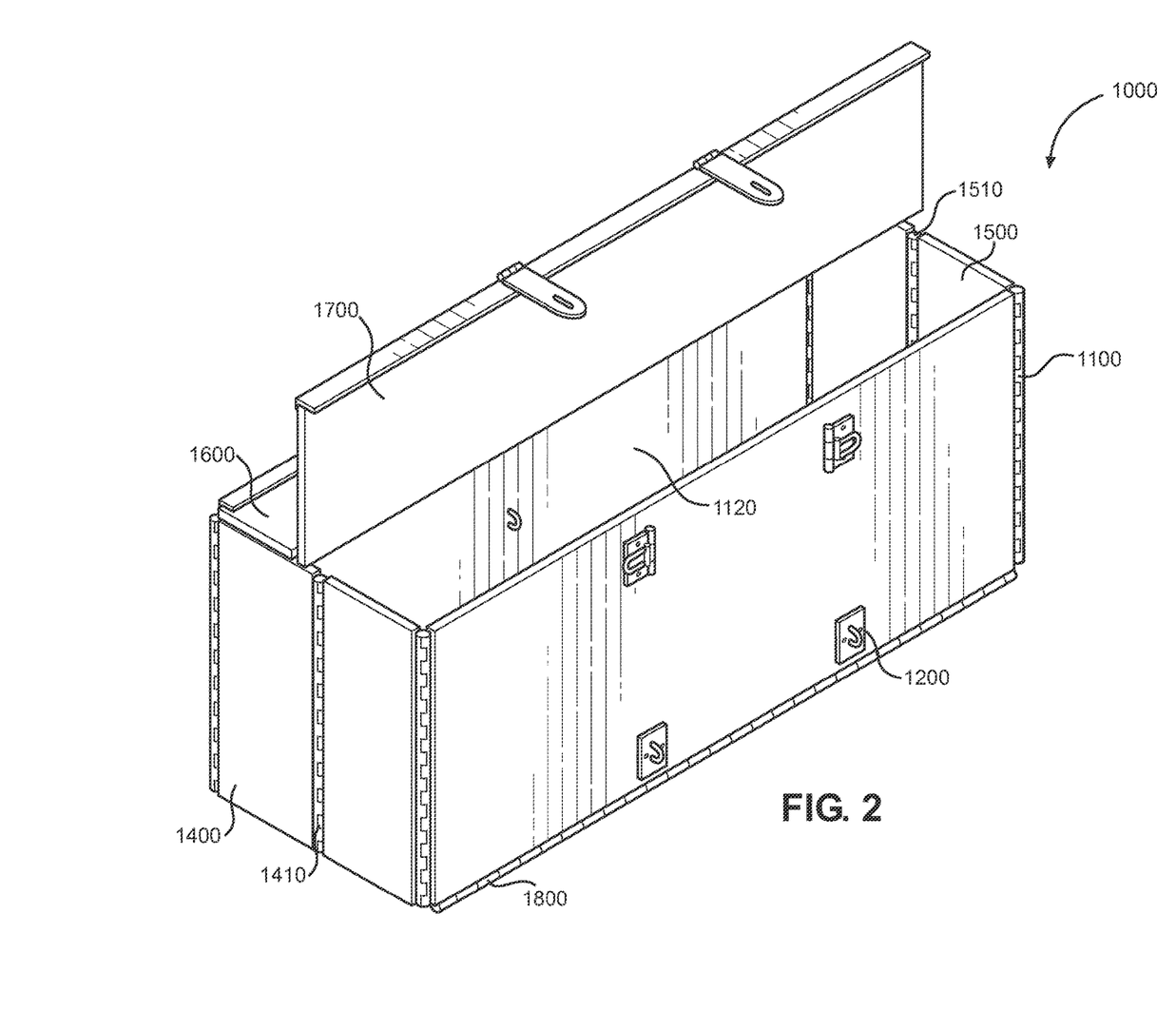
FIG. 2 shows a perspective view of an embodiment of the collapsible cargo utility box wherein the lid is open.

Referring now to FIGS. 1 and 2, there are shown perspective views of an embodiment of the collapsible cargo utility box, wherein the lid is closed and open, respectively. The collapsible cargo utility box 1000 comprises housing 1100 having a front wall 1200, a rear wall 1300, a first sidewall 1400 opposing a second sidewall 1500 forming an interior volume 1120. An upper wall 1600 extends from the rear wall 1300, wherein a lid 1700 is pivotally secured to the upper wall 1600 and removably covers an opening 1130 of the housing 1100. In the illustrated embodiment, the utility box 1000 comprises a rectangular cross section and is configured to secure to the bed of a truck. However, in alternate embodiments, the utility box comprises any suitable shape and is adapted to provide storage space in other types of vehicles and locations.

The housing 1100 is movable between a collapsed configuration and an in-use configuration. In the shown in-use configuration, the front wall 1200 and rear wall 1300 are parallel to one another, wherein the first and second sidewalls 1400, 1500 are parallel to each other forming the rectangle shaped cross section. The first and second sidewall 1400, 1500 each comprise a hinge joint 1410, 1510 configured to collapse inward towards the interior volume of the housing 1100. In the illustrated embodiment, the hinge joints 1410, 1510 are linear and extend between the lower end and upper end of the housing 1100 such that the hinge joints are parallel to the front and rear walls 1200, 1300. In the illustrated embodiment, the hinge joints 1410, 1510 are a hinge formed between two panels that form each sidewall.

In the illustrated embodiment, the upper wall 1600 is fixed to the rear wall 1300 and does not pivot therewith. The upper wall 1600 extends perpendicular to the rear wall 1300 and is directly attached thereto in the illustrated embodiment. The upper wall 1600 extends the entire length of the housing, wherein the length is measured between the pair of sidewalls. The width of the upper wall 1600 only partially covers the opening of the housing 1100 disposed at the upper end thereof. In the shown embodiment, the upper wall 1600 does not extend beyond the hinge joints of the sidewalls when the housing 1100 is in the in-use configuration. In the illustrated embodiment, the upper wall 1600 comprises between 10% to 30% of the top surface of the utility box 1000 in the in-use configuration.

The lid 1700 is adapted to provide selective access to the interior volume of the housing 1100 and covers the remainder of the opening of the housing 1100. In the illustrated embodiment, the lid 1700 also extends the length of the housing 1100. The upper wall 1600 and lid 1700 are parallel to a bottom section 1800 in the in-use configuration. The lid 1700 is adapted to rotate about a hinge connected to the upper wall 1600.

Figure 3:
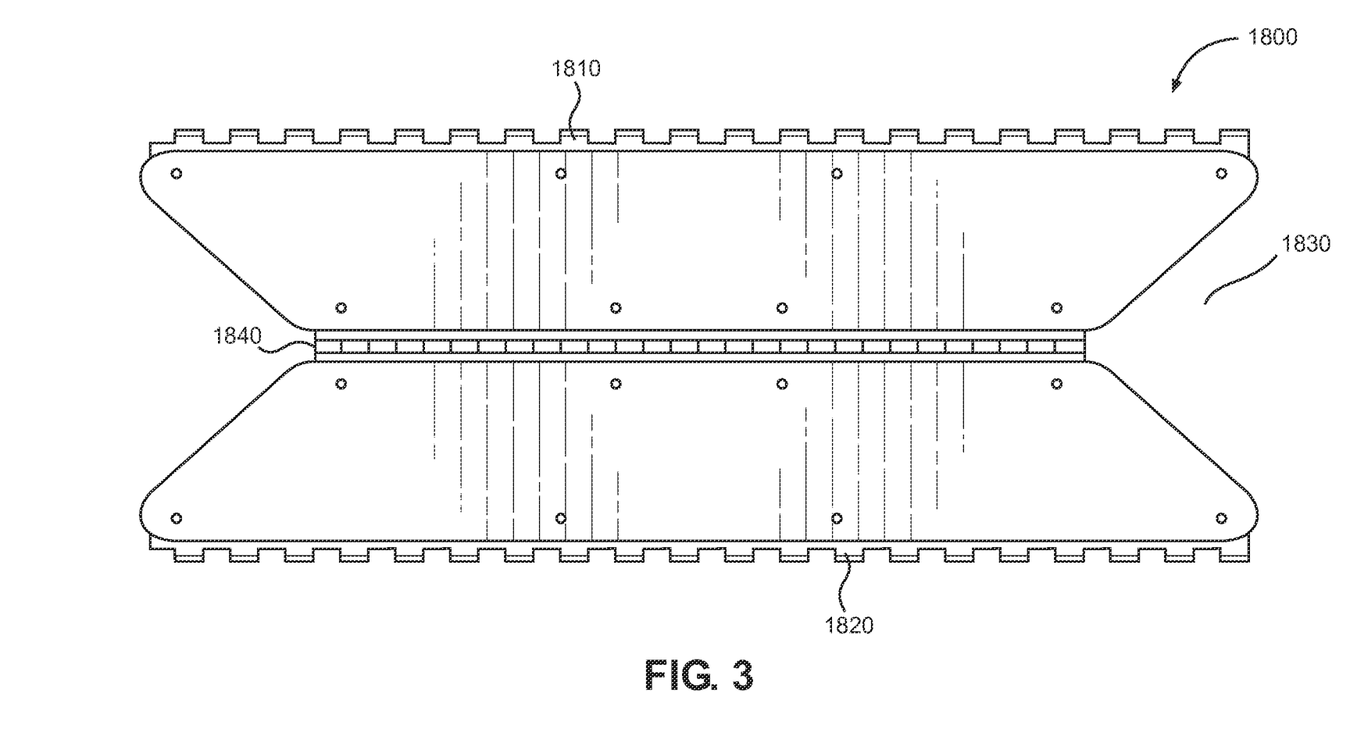
FIG. 3 shows a top planar view of a floor of an embodiment of the collapsible cargo utility box.
Figure 4:
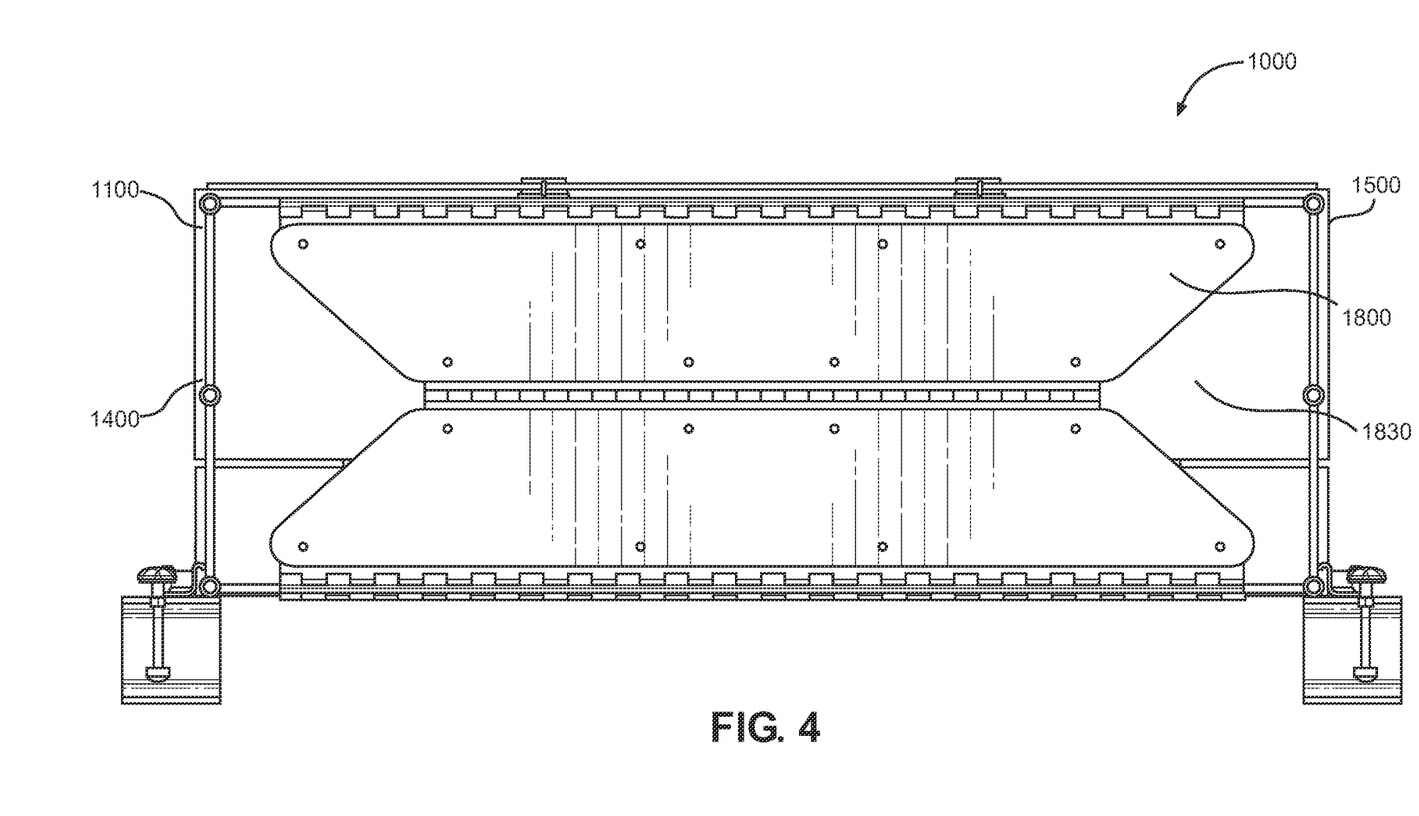
FIG. 4 shows a bottom planar view of an embodiment of the collapsible cargo utility box.
Figure 5:
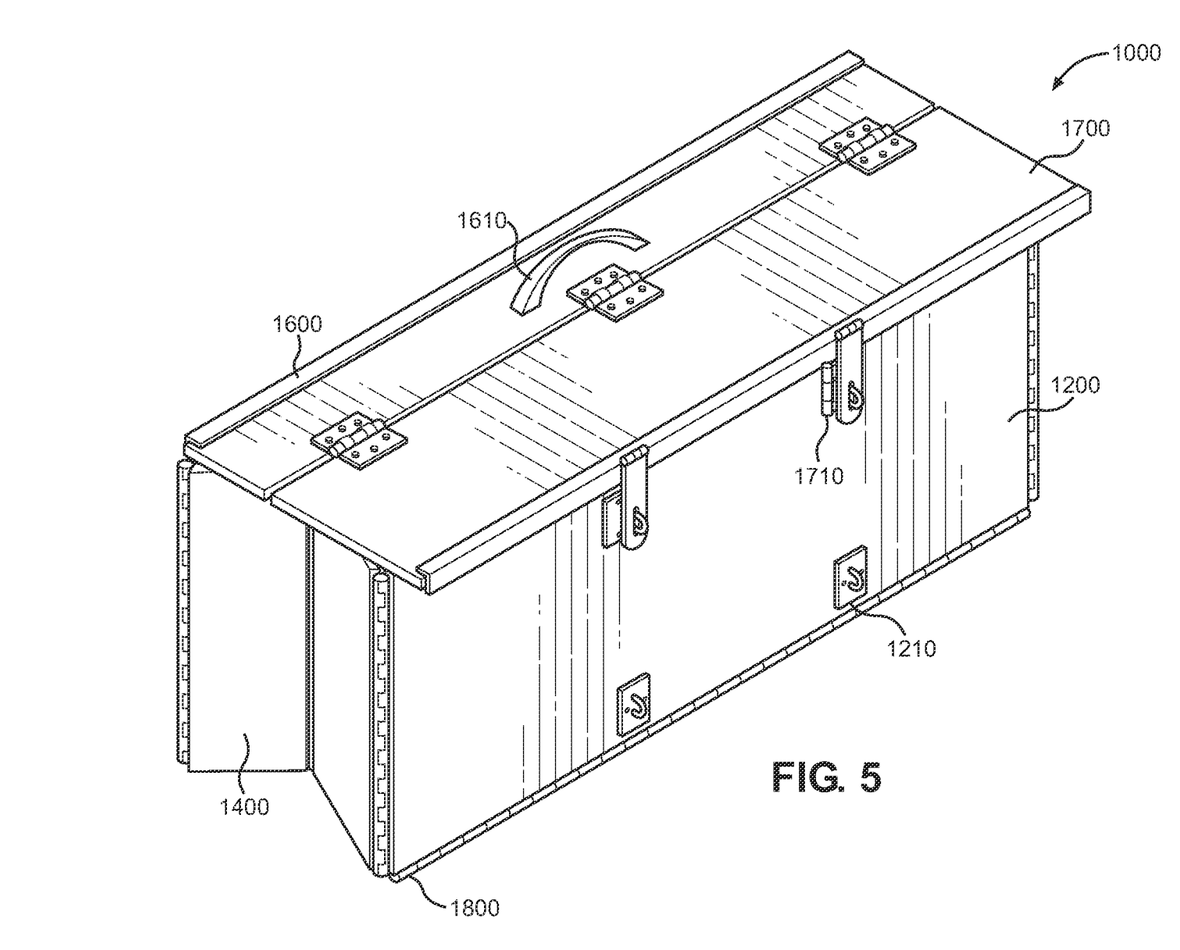
FIG. 5 shows a perspective view of an embodiment of the collapsible cargo utility box wherein a sidewall is partially collapsed.

Referring now to FIGS. 3 and 4, there is shown a top planar view of a floor of an embodiment of the collapsible cargo utility box and a bottom planar view of an embodiment of the collapsible cargo utility box, respectively. The housing 1100 of the collapsible cargo utility box 1000 further comprises a base 1800 pivotally secured between the front wall and rear wall. The base 1800 forms the bottom section of the housing 1100. In the illustrated embodiment, the base 1800 is directly secured to both the front and rear walls via a hinge disposed on opposing sides 1810, 1820 of the base along a perimeter thereof. In the in-use configuration, the base 1800 is parallel to both the rear and front walls.

The base 1800 is adapted to fold inwards via a pivot 1840 when transitioning from the in-use configuration (shown in FIGS. 3 and 4) to the collapsed configuration. In the in-use configuration, the base 1800 is flat. The base 1800 comprises a pair of cutouts 1830 disposed on opposite sides thereof, wherein the cutouts 1830 are adapted to receive the first and second sidewall 1400, 1500, respectively, in the collapsed configuration. In the in-use configuration, the cutouts 1830 form a v-shaped gap between the base 1800 and the sidewalls 1400, 1500. In the illustrated embodiment, the pivot 1840 of the base 1800 is disposed centrally and extends between the pair of cutouts 1830. In the illustrated embodiment, the pair of cutouts comprise a triangular shape. However, in alternate embodiments, the cutouts comprise any suitable shape configured to provide a space to receive the sidewalls as they move inwards to the collapsed configuration.

Figure 6:
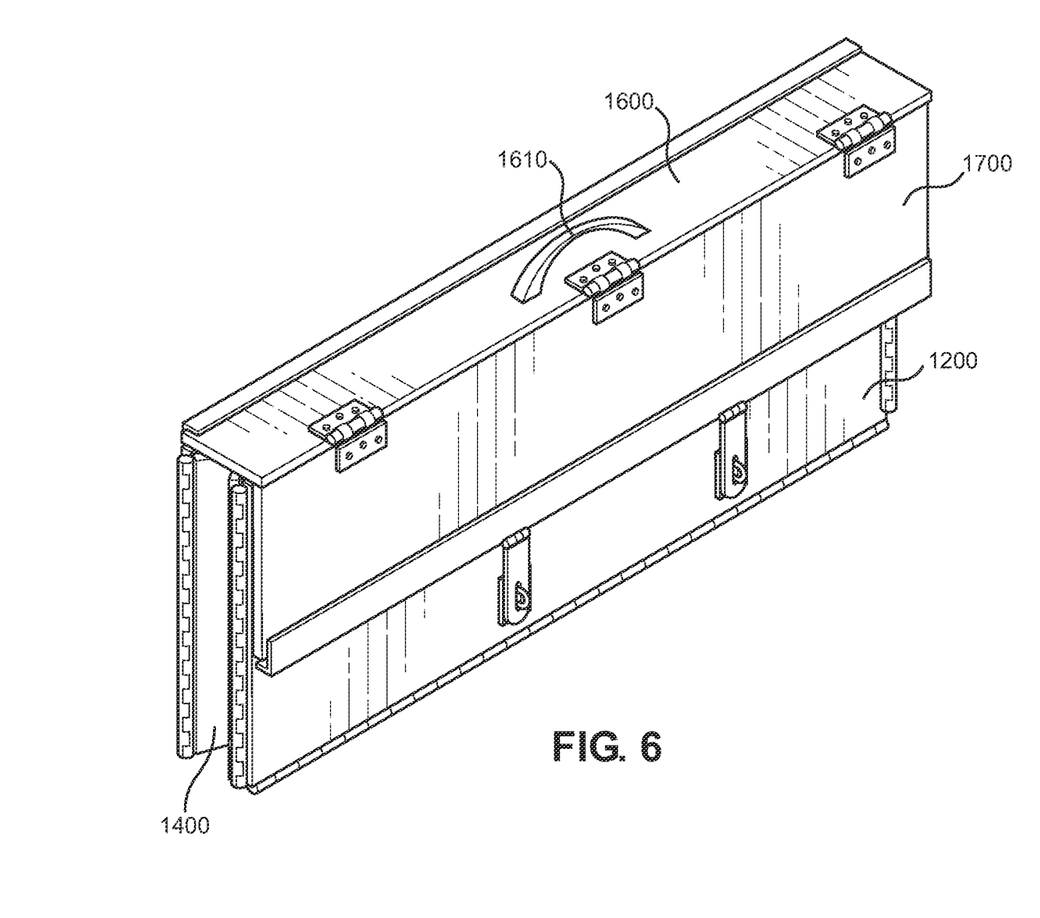
FIG. 6 shows a perspective view of an embodiment of the collapsible cargo utility box in a collapsed configuration.

Referring now to FIGS. 4-7, there is shown a perspective view of an embodiment of the collapsible cargo utility box wherein a sidewall is partially collapsed, a perspective view of an embodiment of the collapsible cargo utility box in a collapsed configuration, a side perspective view of an embodiment of the collapsible cargo utility box in a folded configuration and a cross sectional view of an embodiment of the collapsible cargo utility box in a collapsed configuration taken along line 7-7 of FIG. 6, respectively. When transitioning from the in-use configuration to the collapsed configuration, the base 1800 and sidewalls 1400 fold within the interior volume of the housing 1100. The lid 1700 rotates downwards until parallel with the front and rear walls 1200, 1300.

Figure 7:
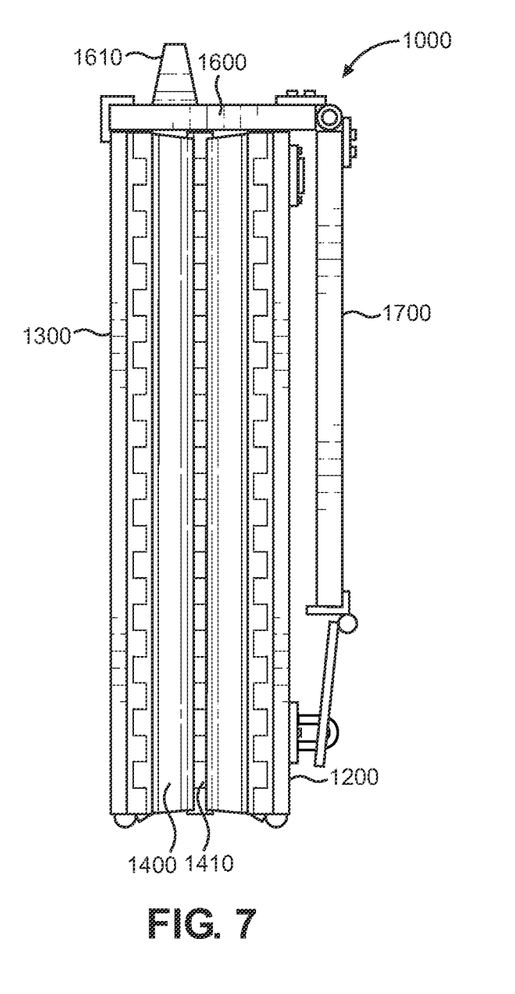
FIG. 7 shows a side perspective view of an embodiment of the collapsible cargo utility box in a folded configuration.

In the collapsed configuration, the upper wall 1600 forms the entire top surface of the housing 1100 and the lid 1700 is parallel to the front and rear walls 1200, 1300. The lid 1700 is directly adjacent to the front wall 1300 in the collapsed configuration and in some embodiments flush therewith. In the illustrated embodiment, a gap is disposed between the front wall and lid 1700 when collapsed. The rear wall 1300 and front wall 1200 remain parallel to one another in both the in-use and collapsed configurations. In the illustrated embodiment, a handle 1610 is disposed on the upper wall 1600 to allow a user to easily grasp the utility box 1000 in the collapsed configuration for transport.

In the illustrated embodiment, the front wall 1200 comprises a lower U-shaped fastener 1210 and an upper U-shaped fastener each configured to receive a same latch 1710 hingedly secured to and disposed on the lid 1700. The upper fastener is configured to receive the latch 1710 in the in-use configuration and the lower fastener is configured to receive the latch 1710 in the collapsed configuration. In the illustrated embodiment, the upper fastener is pivotally secured to the front wall 1200 of the housing and moves side to side to fold down atop the front wall when not in use. In this way, the upper fastener does not interfere or prevent the lid 1700 from laying parallel with the front wall when in the collapsed configuration. In the illustrated embodiment, the lower fastener 1210 and latch 1710 remain continuously unfastened in the in-use configuration because they are physically distanced from each other so as not to connect to one another until in the collapsed configuration. In the illustrated embodiment, each fastener is configured to extend through an opening within the latch. Once a fastener is received by the latch, a padlock or other secondary securement fastener can be threaded through the U-shape of the fastener and locked to prevent the latch from lifting away from the upper or lower fastener.

Figure 8:
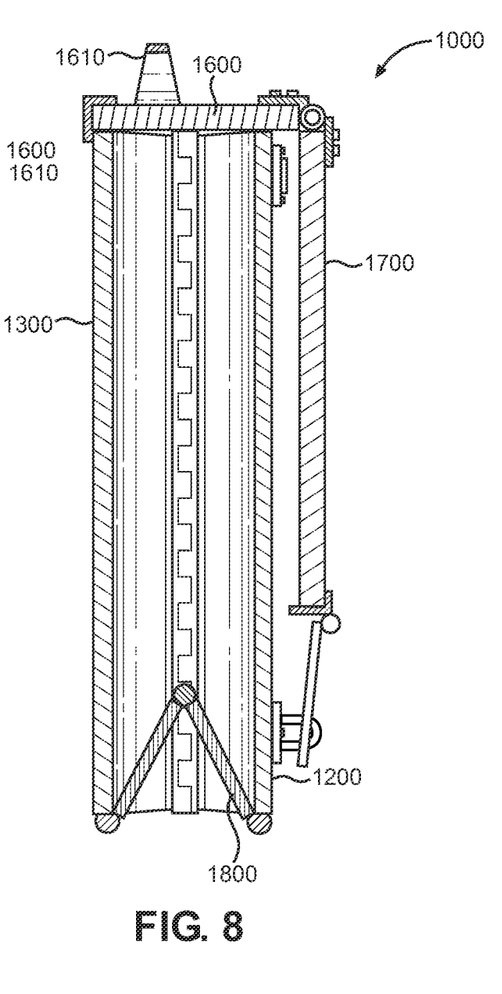
FIG. 8 shows a cross sectional view of an embodiment of the collapsible cargo utility box in a collapsed configuration of FIG. 7.

Referring now to FIG. 8, there is shown a perspective view of a tote insert of an embodiment of the collapsible cargo utility box. In some embodiments, the collapsible cargo utility box comprises a tote insert 1900 adapted to cover the base, the first and second sidewalls, and front and rear walls of the housing with a layer of material forming a liner. In some embodiments, the tote insert 1900 is composed of nylon, plastic, canvas, or any similar material suitable for the purpose. The tote insert 1900 is configured to be placed into the utility box and secured but can also be removed as needed. The tote insert comprises a same size and shape of the interior of the utility box. In some embodiments, the tote insert comprises handles 1910 extending from opposing sides thereof to allow easy removal and carrying. This allows for quick and easy transfer of objects to and from the utility box.

Figure 9:
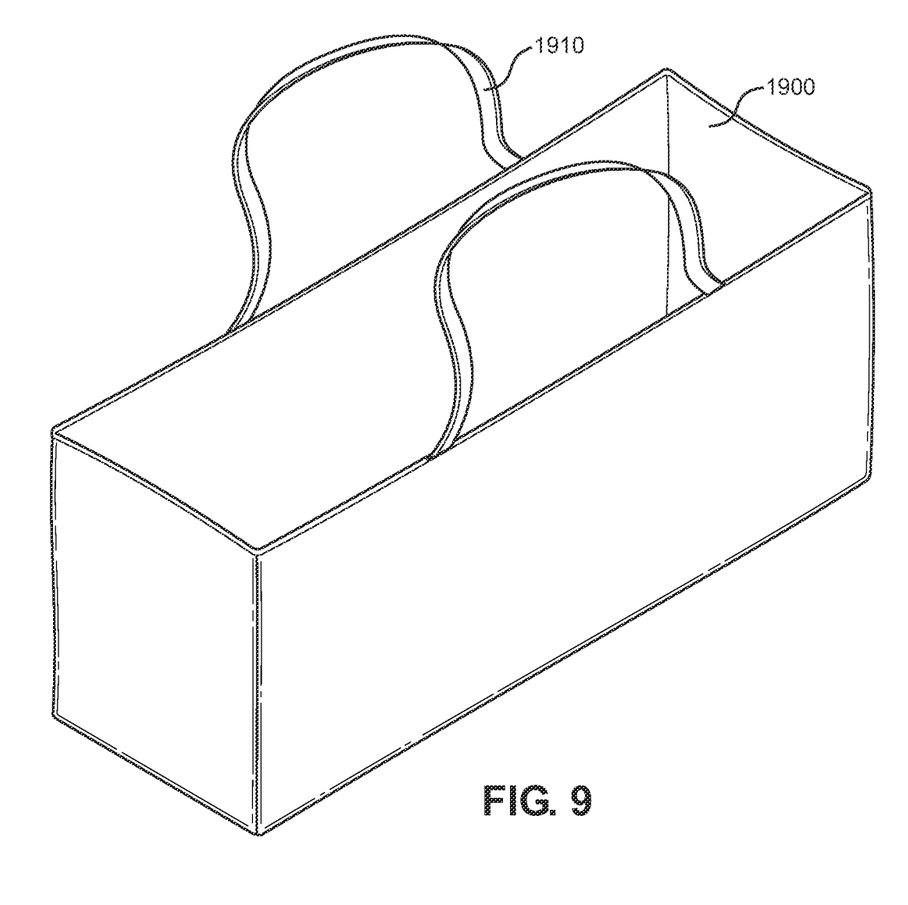
FIG. 9 shows a perspective view of a tote insert of an embodiment of the collapsible cargo utility box.
Figure 10:
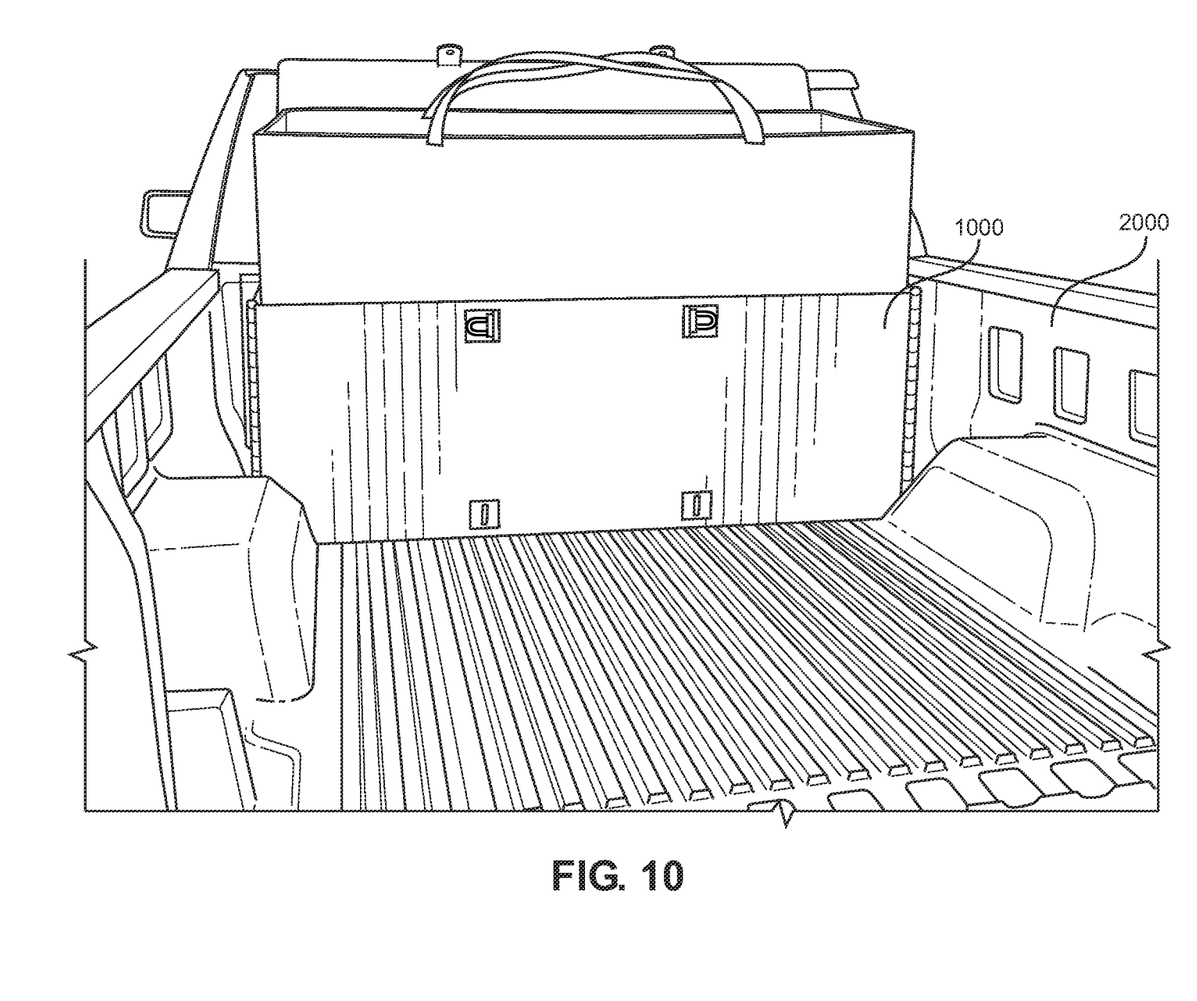
FIG. 10 shows a side perspective view of an embodiment of the collapsible cargo utility box installed on a vehicle.

Referring now to FIG. 9, there is shown a side perspective view of an embodiment of the collapsible cargo utility box installed on a vehicle. In the illustrated embodiment, the collapsible cargo utility box 1000 is configured to extend a width of a truck bed 6000 and fasten thereto via a fastener disposed along the rear wall of the housing. In one embodiment, the truck bed 6000 has a width of between forty-nine inches and sixty-five inches. The utility box 1000 is configured to fold down flat into the collapsed configuration and/or be easily removed when not in use. In some embodiments, the housing of the utility box 1000 is composed of metal, hard plastic, fiberglass, or any similar material suitable for durable transportation and the containment of objects. In one possible embodiment, the utility box is constructed with a solid front wall, a solid rear wall, but with sidewalls and base that are hinged in a such a manner as to allow them to collapse. The folding hinged base is provided so that together with the hinged sidewalls, the entire device can fold in to a flat collapsible configuration.

The box can be securely attached to the bed of the pickup by way of adjustable clamps, brackets, etc. (as seen in FIG. 1, reference numeral 1350), but is not a permanent attachment. The design allows storage and transportation of personal property in the bed of the pickup as well as easy transportation of the unit itself.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A collapsible cargo utility box, comprising:
a housing having a front wall, a rear wall, a first sidewall opposing a second sidewall, and an interior volume;
an upper wall extends from the rear wall, wherein a lid is pivotally secured to the upper wall and removably covers an opening of the housing;
wherein the first and second sidewall each comprise a hinge joint configured to collapse inward towards the interior volume of the housing;
wherein each hinge joint extends parallel to the front and rear walls;
a base pivotally secured between the front wall and rear wall;
wherein the housing is moveable between a collapsed configuration and an in-use configuration;
a handle extending from the upper wall;
wherein the upper wall and base are parallel to one another in the in-use configuration;
wherein a transition between the in-use configuration and the collapsed configuration, the front wall moves towards the rear wall thereby reducing a volume capacity of the interior volume;
wherein the base comprises a pair of cutouts disposed on opposite sides, wherein the cutouts receive the first or second sidewall in the collapsed configuration.

2. The collapsible cargo utility box of claim 1, wherein the upper wall extends between the rear wall and the hinge joint of the first and second sidewalls in the in-use configuration.

3. The collapsible cargo utility box of claim 1, wherein the upper wall forms an entire top surface of the housing in the collapsed configuration.

4. The collapsible cargo utility box of claim 1, wherein the lid is parallel to the front wall in the collapsed configuration.

5. The collapsible cargo utility box of claim 1, wherein the lid is parallel to the base in the in-use configuration.

6. The collapsible cargo utility box of claim 1, wherein the rear wall and front wall are parallel to one another in both the in-use and collapsed configurations.

7. The collapsible cargo utility box of claim 1, wherein the pivot of the base is disposed centrally and extends between the pair of cutouts.

8. The collapsible cargo utility box of claim 1, wherein the pair of cutouts each comprise a triangular shape.

9. The collapsible cargo utility box of claim 1, wherein the front wall comprises an upper fastener and a lower fastener each configured to receive a same latch disposed on the lid.

10. The collapsible cargo utility box of claim 9, wherein the latch and lower fastener remain continuously unfastened in the in-use configuration.

11. The collapsible cargo utility box of claim 1, wherein the collapsible cargo utility box is configured to extend a width of a truck bed and fasten thereto via a fastener disposed along the rear wall of the housing.

12. The collapsible cargo utility box of claim 1, further comprising an insert adapted to cover the base, first and second sidewalls, and front and rear walls of the housing with a layer of material.

13. A collapsible cargo utility box, comprising:
a housing having a front wall, a rear wall, a first sidewall opposing a second sidewall, and an interior volume;
an upper wall extends from the rear wall, wherein a lid is pivotally secured to the upper wall and removably covers an opening of the housing;
wherein the first and second sidewall each comprise a hinge joint configured to collapse inward towards the interior volume of the housing;
wherein the housing is moveable between a collapsed configuration and an in-use configuration;
a base pivotally secured between the front wall and rear wall;
wherein the base comprises a pair of cutouts disposed on opposite sides, wherein the cutouts receive the first or second sidewall in the collapsed configuration.

14. The collapsible cargo utility box of claim 13, wherein hinge joint extends parallel to the front and rear walls.

15. The collapsible cargo utility box of claim 14, wherein the upper wall and base are parallel to one another in the in-use configuration.

16. The collapsible cargo utility box of claim 15, wherein the upper wall extends between the rear wall and the hinge joint of the first and second sidewalls.

17. The collapsible cargo utility box of claim 16, wherein the upper wall forms the entire top surface of the housing in the collapsed configuration.

18. The collapsible cargo utility box of claim 17, wherein the lid is parallel to the front wall in the collapsed configuration.

19. The collapsible cargo utility box of claim 18, wherein the lid is parallel to the base in the in-use configuration.

\* \* \* \* \*